US012708811B2

(12) United States Patent
Ramoutar et al.

(10) Patent No.: US 12,708,811 B2
(45) Date of Patent: Aug. 18, 2026

(54) COMBINED HVAC AND FIRE SUPPRESSION SYSTEM

(71) Applicant: Carrier Corporation, Palm Beach Gardens, FL (US)

(72) Inventors: Michael Ramoutar, Westford, MA (US); Michel Grabon, Montluel (FR); Nazar Krutskevych, Gdańsk (PL)

(73) Assignee: KIDDE FIRE PROTECTION, LLC, Bradenton, FL (US)

( * ) Notice: Subject to any disclaimer, the term of this patent is extended or adjusted under 35 U.S.C. 154(b) by 418 days.

(21) Appl. No.: 18/159,378

(22) Filed: Jan. 25, 2023

(65) Prior Publication Data

US 2023/0233893 A1 Jul. 27, 2023

(30) Foreign Application Priority Data

Jan. 26, 2022 (EP) .................................... 22153457

(51) Int. Cl.
*A62C 35/60* (2006.01)
*F24F 5/00* (2006.01)

(52) U.S. Cl.
CPC ............ *A62C 35/60* (2013.01); *F24F 5/0003* (2013.01); *F24F 2221/00* (2013.01)

(58) Field of Classification Search
CPC ............. B63J 2/02; A62C 35/60; A62C 35/68
See application file for complete search history.

(56) References Cited

U.S. PATENT DOCUMENTS

| | | | |
|---|---|---|---|
| 3,939,914 | A | 2/1976 | Carroll |
| 4,286,667 | A | 9/1981 | Westenhofer et al. |
| 5,181,387 | A | 1/1993 | Meckler |
| 5,183,102 | A | 2/1993 | Clark |
| 6,474,086 | B1 | 11/2002 | Liu |
| 8,955,607 | B2 | 2/2015 | Whitney, Jr. |

(Continued)

FOREIGN PATENT DOCUMENTS

| | | | | |
|---|---|---|---|---|
| CN | 104879947 A | | 9/2015 | |
| CN | 106556191 A | * | 4/2017 | B63J 2/02 |

(Continued)

OTHER PUBLICATIONS

English translation KR-20110005588-A (Year: 2011).*

(Continued)

*Primary Examiner* — Qingzhang Zhou

(74) *Attorney, Agent, or Firm* — CANTOR COLBURN LLP

(57) ABSTRACT

A combined HVAC and fire suppression system includes a HVAC apparatus and a fluid outlet for release of heat exchange fluid into a discharge plenum of the HVAC system. The heat exchange fluid is a clean agent, such that release of the heat exchange fluid into the discharge plenum provides a fire suppressant effect for a conditioned space. The HVAC apparatus includes a network of piping holding a heat exchange fluid and arranged for chilling the heat exchange fluid via a chiller connected to the piping; a fan coil unit connected to the network of piping, the fan coil unit includes a coil for passage of the heat exchange fluid chilled by the chiller, a fan for movement of air over the coil in order to transfer heat from the air to the heat exchange fluid in the coil, and the discharge plenum.

18 Claims, 2 Drawing Sheets

(56) References Cited

U.S. PATENT DOCUMENTS

| | | | | |
|---|---|---|---|---|
| 10,410,310 | B2 | 9/2019 | Bora | |
| 2003/0015326 | A1 | 1/2003 | Haase, III | |
| 2003/0051886 | A1 * | 3/2003 | Adiga | A62C 99/0072 169/43 |
| 2007/0007212 | A1 | 1/2007 | Harley et al. | |
| 2015/0144311 | A1 | 5/2015 | Grabon et al. | |
| 2016/0101306 | A1 * | 4/2016 | Hennegan | A62C 37/36 169/17 |
| 2020/0129796 | A1 | 4/2020 | Bogart et al. | |
| 2020/0139169 | A1 | 5/2020 | Benefield | |

FOREIGN PATENT DOCUMENTS

| | | | | | |
|---|---|---|---|---|---|
| CN | 106765833 | A | | 5/2017 | |
| CN | 110510096 | A | * | 11/2019 | B63J 2/02 |
| CN | 110736182 | A | | 1/2020 | |
| DE | 19651866 | A1 | | 4/1997 | |
| EP | 1443277 | A1 | | 8/2004 | |
| EP | 1988349 | A1 | | 11/2008 | |
| KR | 20110005588 | A | * | 1/2011 | B63J 2/02 |
| KR | 20120091542 | A | * | 8/2012 | F24F 7/06 |
| WO | 2012010987 | A1 | | 1/2012 | |
| WO | 2013175255 | A1 | | 11/2013 | |
| WO | 2019149936 | A1 | | 8/2019 | |
| WO | 2020264123 | A1 | | 12/2020 | |

OTHER PUBLICATIONS

English translation CN-106556191-A (Year: 2017).*

English translation CN-110510096-A (Year: 2019).*

European Search Report for application EP 22153457.1, Jul. 12, 2022, 9 pages.

* cited by examiner

COMBINED HVAC AND FIRE SUPPRESSION SYSTEM

FOREIGN PRIORITY

This application claims priority to European Patent Application No. 22153457.1, filed Jan. 26, 2022, and all the benefits accruing therefrom under 35 U.S.C. § 119, the contents of which in its entirety are herein incorporated by reference.

BACKGROUND

The present invention relates to a combined HVAC and fire suppression system and hence to a system providing both HVAC functions and fire suppression functions, with common structural features. The invention also relates to corresponding methods.

Heating, Ventilation and Air Conditioning (HVAC) systems are used in buildings and other installations (e.g. marine vessels) to provide one or more of heating, ventilation and air conditioning. In many cases common air paths are used for each of those functions, with heating and/or cooling coils placed in the air paths to allow the system to increase or decrease the air temperature for controlling the temperature of a room or the like. Often this is done via a fan-coil unit, which includes a fan for drawing air over the coil(s) as well as typically a filtering capability. This can be air taken from a room, or air from an outside source, or combinations of in-room air and outdoor air.

The fan-coil unit can comprise a coil for reducing the air temperature, where this coil is a heat exchanger with flow paths that can be supplied with chilled water from a refrigeration system. The refrigeration system may be a vapour compression type refrigeration system. It may be located remote from the fan coil unit. When the refrigeration system is located remote from the fan coil unit then it may supply chilled water via piping extending to multiple fan coil units in different parts of the building. These fan-coil units can also be called water terminal units.

The fan-coil unit may in some cases be supplied with heated water from a refrigeration system, i.e. acting as a heat pump, and in that case it may be the same refrigeration system with switchable operation so that heated water can be provided to the same heat transfer coil as the chilled water. Alternatively, the HVAC system may include provision of heated water via a different source of heat, e.g. a boiler, a solar heater, or a second refrigeration circuit dedicated for heat pump operation. In that instance the fan-coil unit can have a second coil dedicated for heating the air. There can be multiple sources of heat where a HVAC system or other control system selects an optimal heat source from several options.

Known HVAC systems may include fan-coil units in each area of a structure requiring heating and/or cooling, and may hence the HVAC system have the ability to control air temperature in all occupied spaces of the structure.

In addition to HVAC systems, it is known for structures such as buildings to include a fire system that can comprise fire suppression capabilities, as well as often fire detection capabilities, fire alarms and so on. Thus, it is known for a structure to have a fire suppression system including fire suppression devices, e.g. for rooms of a building and/or other types of protected location. Often the fire suppression devices can be activated automatically. One example of a fire suppression system is a sprinkler system, which generally includes sprinkler devices arranged to expel fluid for suppressing or preventing fire. It has been proposed to combine a sprinkler system with heating and/or cooling devices, such as by combined use of water pipes for fan coil units as well as for sprinklers. An example of such a combined HVAC and fire suppression system can be found in U.S. Pat. No. 5,183,102.

SUMMARY

Viewed from a first aspect, the invention provides a combined HVAC and fire suppression system, comprising: a HVAC apparatus including: a network of piping holding a heat exchange fluid and arranged for chilling the heat exchange fluid via a chiller connected to the piping; a fan coil unit connected to the network of piping, wherein the fan coil unit includes a coil for passage of the heat exchange fluid chilled by the chiller, a fan for movement of air over the coil in order to transfer heat from the air to the heat exchange fluid in the coil, and a discharge plenum for passage of air into a conditioned space after it has moved over the coil; and a fluid outlet for release of the heat exchange fluid into the discharge plenum; wherein the heat exchange fluid in the network of piping is a clean agent, such that release of the heat exchange fluid into the discharge plenum provides a fire suppressant effect for the conditioned space.

Advantageously, the proposed combined system uses a clean agent as the heat exchange fluid for the HVAC apparatus in place of water as is commonly used in the prior art. Such clean agents (also known as waterless fire suppression agents) have been found to provide highly effective fire suppression when released into the air via the discharge plenum, since they evaporate swiftly to form fire suppressing gases that are readily distributed by action of the fan coil unit. Installation and maintenance actions are consolidated within a combined system, optionally with a combined control, and thus for example there may be no need to have separate maintenance/safety checks on both of a separate HVAC system and suppression system. Whilst combined HVAC and suppression has been suggested in the prior art, it has been realised that known combined HVAC and suppression systems using sprinklers have problems, since temperature changes in the sprinkler circuit risk either heating leading to inadvertent triggering of sprinklers/detectors and/or chilling that may prevent a required triggering of the sprinkler. Moreover, there are significant disadvantages to the use of water in many environments. The inventors propose to substitute the heat exchange water in a water terminal type HVAC system with a suppression agent not traditionally used for heat exchange in water terminal fan coil units. The system of the first aspect hence includes a clean agent within the network of piping, wherein this clean agent is used as a heat exchange fluid during HVAC operation. This, along with the fluid outlet, then permits the fire suppression agent to be deployed in gaseous form via a fan coil unit that is already located/optimised for distribution of air to the structure (e.g. in a building), whilst not needing any significant added pipework or installation effort compared to a typical water terminal type HVAC system.

The system may comprise a pump connected to the network of piping for pumping of the heat exchange fluid (clean agent) within the network of piping. The pump may convey the heat exchange fluid between the chiller and fan coil unit in a HVAC mode operation, as well as being configured for pumping the heat exchange fluid out of the fluid outlet in a fire suppression mode of operation. The network of piping may be connected to an expansion tank in order to ensure adequate supply of heat exchange fluid for dispersal as a fire suppression agent.

The system may include the chiller. In some examples the chiller comprises a refrigeration system having a refrigeration circuit, e.g. a vapour compression circuit, in order to remove heat from the heat exchange fluid. This may be done via action of one or more heat absorbing heat exchangers of the chiller.

A clean agent is present and is used as the heat exchange fluid. This clean agent may be a so-called waterless fire suppression agent, for example a halocarbon fire suppression agent such as a fluorinated ketone fire suppression agents. Examples include FK-5-1-12 fluids as available under the brand name Novec™ from 3M Company. The heat exchange fluid may for example be Novec 1230 or Novec 7000.

The fluid outlet for release of the heat exchange fluid into the discharge plenum may comprise one or more nozzles in or near to the discharge plenum. The system may include a valve for controlling the flow of fluid out of the fluid outlet. In some examples the fluid outlet directs the flow onto a surface to promote evaporation thereof, e.g. by flow that impacts onto an outer surface of the discharge plenum to increase the evaporation rate of the heat exchange fluid.

The system may include an ultrasonic evaporation device for promoting the evaporation of fluid. Such an evaporation device may comprise an ultrasonic transducer for vibrating an evaporation surface to promote evaporation of fluid on the evaporation surface. There may be an array of ultrasonic transducers. The evaporation surface may be at a base of the discharge plenum in order that fluid may flow via gravity toward the evaporation surface. The ultrasonic evaporation device may be used for generating a water mist without the need for high pressure water, so that water can be used as an added suppression agent. This could be deployed as a primary suppression agent in some situations, or may advantageously be used for magnifying the suppression effect of the clean agent.

The fluid outlet for the heat exchange fluid may be located to direct fluid toward the evaporation surface, e.g. in order to promote complete/quicker evaporation and thereby better distribution of the gaseous clean agent into the conditioned space. Alternatively or additionally the system may include a water outlet for emitting water, e.g. as a spray, onto the evaporation surface, whereby the ultrasonic vibration promotes creation of water vapour to provide an added fire suppression effect. In this way the fan coil unit may be used to distribute water vapour along with, or instead of, the heat exchange fluid in order to add to the fire suppression effect or in order to permit continued fire suppression effect once the supply of heat exchange fluid has been depleted. This system could additionally or alternatively have the function of releasing water for controlling the humidity of the air in the conditioned space, e.g. in normal use of the fan coil unit. The ultrasonic evaporation device may be controllable to set the size of the water droplets.

The water outlet may for example be connected to a mains water supply, e.g. tap water for a building. The use of the ultrasonic evaporation device means that there is no need for a high pressure water supply, which avoids the need for a dedicated pump and water distribution network.

The fan-coil unit may be arranged with the fan after the coil, i.e. so that in HVAC use the fan draws air over the coil rather than blowing air toward the coil. This can enhance the effectiveness of the fan coil unit for distribution of the heat exchange fluid as a fire suppression agent. The HVAC apparatus may comprise multiple fan coil units connected to the same network of piping, and hence coupled to the same chiller, in order to provide HVAC functions for larger conditioned spaces and/or for multiple conditions spaces, such as for multiple rooms of a building or other structure. The fan coil unit may include a second coil for heating of the air and in that case the system may comprise a heater, such as a heat pump or a boiler, for heating a second heat exchange fluid for the second coil. This second heat exchange fluid can be in a second network of piping. The second heat exchange fluid may be water, for example.

For the first network of piping the heat exchange fluid is a clean agent rather than water. This provides advantages in relation to selection of materials, since water corrosion is no longer a problem. The system may include an aluminium heat absorbing heat exchanger for the chiller and/or an aluminium coil for the fan coil unit.

The system may comprise fire detection devices, which may advantageously be mounted in the same locations as the fan coil units. A fire detection device may for example be included in or on the fan coil unit. Alternatively or additionally a fire detection device may be provided with a thermostat associated with the fan coil unit, or the thermostat may be used to provide a fire detection capability. By including detection in addition to suppression then the system can provide a more complete protection from fire risks.

The combined system may include added features for control of fire suppression and/or detection activities. For example, there may be a fire panel provided in addition to or as a part of a control panel of the HVAC apparatus. In one possible configuration the fire panel may have a loop driver with a fire suppression loop connected to the loop driver of the fire panel and the fire suppression loop configured for control of the fluid outlet, e.g. via a valve as mentioned above, in order to release the heat exchange fluid as fire suppressant when triggered by the fire panel. There may be a plurality of fire detection devices also coupled to the fire panel for the purpose of detecting fire or related events, such as smoke.

The combined HVAC and fire suppression system may be for use within a structure such as a marine vessel or building, and may be configured for installation in such a structure, such as with network of piping extending between multiple conditioned spaces within the structure, e.g. multiple rooms or areas of the marine vessel or building and with a plurality of fan coil units installed within the multiple conditioned spaces.

Viewed from a second aspect, the invention provides a structure such as a marine vessel or a building, the structure comprising a combined HVAC and fire suppression system as described above, i.e., the system of the first aspect and optionally other additional features as set out above.

The invention also extends to a method of providing a structure, such as a marine vessel or a building, with HVAC and fire suppression, the method comprising installing and/or using a combined HVAC and fire suppression system as described above in the structure, i.e. installing and/or using the system of the first aspect and optionally other additional features as set out above.

The method may include modifying an existing HVAC system to provide fire suppression capabilities by removing water used as a heat exchange fluid and replacing it with a clean agent, and adding a fluid outlet for release of the heat exchange fluid into the discharge plenum of a fan coil unit of the HVAC system. The existing HVAC system may comprise a HVAC apparatus including: a network of piping holding a heat exchange fluid and arranged for chilling the heat exchange fluid via a chiller connected to the piping; a fan coil unit connected to the network of piping, wherein the fan coil unit includes a coil for passage of the heat exchange fluid chilled by the chiller, a fan for movement of air over the coil in order to transfer heat from the air to the heat exchange fluid in the coil, and a discharge plenum for passage of air into a conditioned space after it has moved over the coil. The HVAC apparatus and/or the combined system may further include added features as discussed above. The clean agent used for the replacement heat exchange fluid may be as discussed above, e.g. a halocarbon such as FK-5-1-12 fluid. The method may optionally include addition of a water outlet for water vapour fire suppression and/or addition of an evaporation surface using ultrasound transducers, as discussed above.

The method may include installation alone or use alone. When the method includes using the combined HVAC and fire suppression system the method may comprise operating the system in a HVAC mode or in a fire suppression mode. In example embodiments the HVAC mode includes circulation of the heat exchange fluid within the network of piping to convey heat from the coil of the fan coil unit to the chiller; and/or the fire suppression mode includes discharge of the heat exchange fluid via the fluid outlet in order to provide a fire suppression effect by distribution of evaporated heat exchange fluid (clean agent) into the conditioned space. The system may be controlled to operate in the HVAC mode or in the fire suppression mode according to signals from a control system, which may include a fire panel or may be in communication with a fire panel.

DRAWING DESCRIPTION

Certain embodiments will now be described by way of example only and with reference to the accompanying drawing in which.

DETAILED DESCRIPTION

Figure 1:
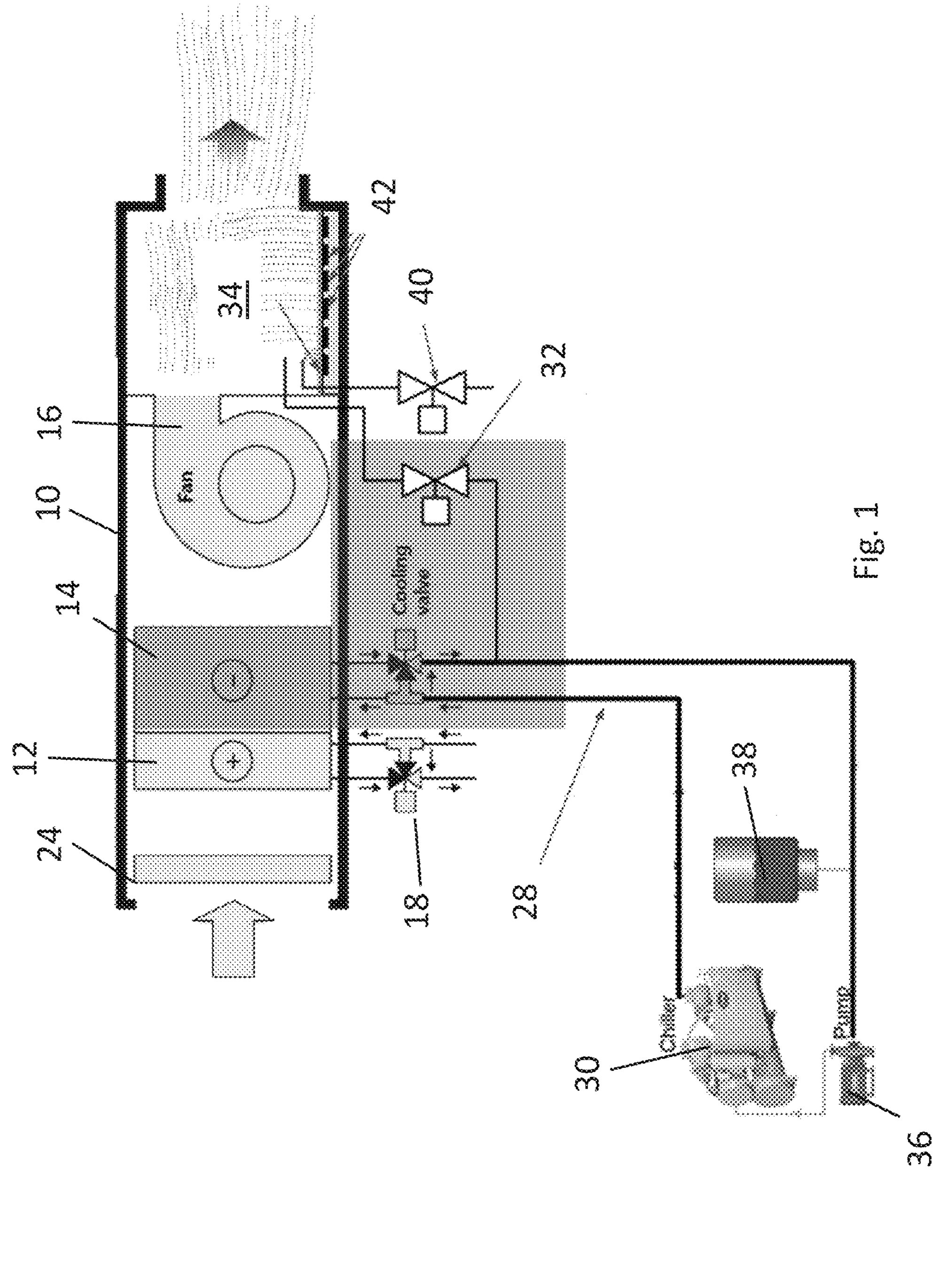
FIG. 1 is a diagram of a combined HVAC and fire suppression system.

Heating, Ventilation and Air Conditioning (HVAC) systems are used in buildings and other installations (e.g. marine vessels) to provide one or more of heating, ventilation and air conditioning. In this example a fan coil unit 10 includes a common air path are used for both heating and cooling functions, with a heating coil 12 and a cooling coil 14 placed in the air path. A fan 16 draws air over the coils 12, 14 to allow the system to increase or decrease the air temperature for controlling the temperature of a room or the like. The fan-coil unit also has a filter 24, which may be for removing particulates and/or gaseous contaminants from the air. This fan coil unit 10 can be used for air in a conditioned space (not shown in FIG. 1, but depicted in FIG. 2) such as a room of a building or of a marine vessel.

Figure 2:
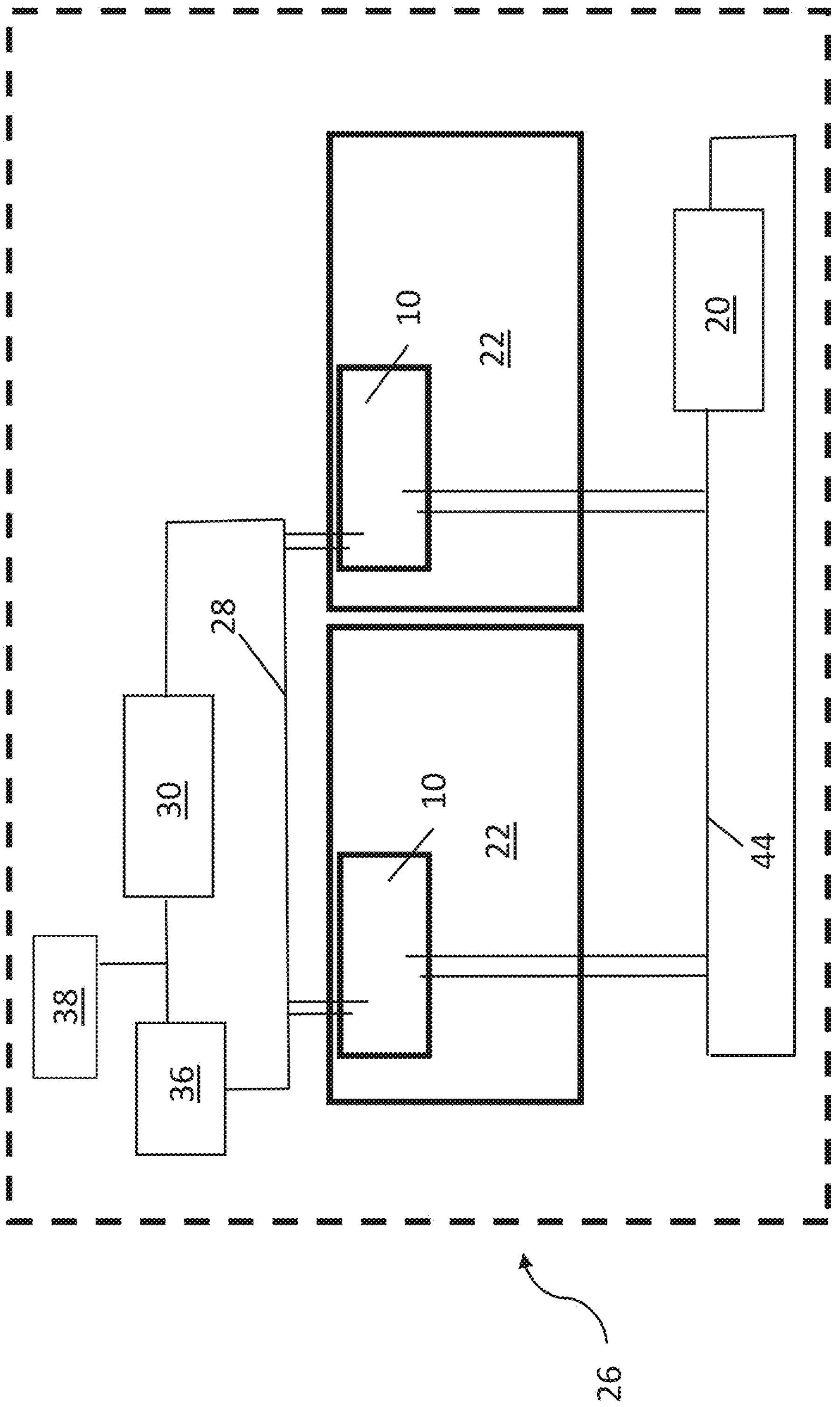
FIG. 2 shows a structure including such a system for multiple conditioned spaces therein.

The coils 12, 14 are heat exchangers. The fan 16 causes air to pass over the coils in order to control the temperature of the air, and the treated air is discharged via the discharge plenum 34 The heating coil 12 is supplied with heated water via a heating valve 18, which is connected to pipework of a heating system as is shown in FIG. 2, e.g. using a boiler 20 to heat the water before distribution about a structure to different fan coil units 10 in different conditioned spaces 22 of a structure 26 such as a building or a marine vessel. The cooling coil 14 is for reducing the air temperature and this coil 14 is a heat exchanger with flow paths that can be supplied with chilled heat exchange fluid from network of piping 28 connected to a refrigeration system or chiller 30. The refrigeration system 30 can be a vapour compression type refrigeration system and it supplies chilled heat exchange fluid via piping 28 extending to multiple fan coil units 10 in different parts of the structure. These fan-coil units 10 are similar to known water terminal units, but in this system the heat exchange fluid for the cooling coil 14 is a clean agent such as a halocarbon clean agent in the form of Novec™ 1230 or Novec™ 7000.

In order to allow for the heat exchange fluid to be used for fire suppression a fluid outlet 32 is provided for discharge of the heat exchange fluid into the discharge plenum 34 of the fan coil unit 10. This has a valve for control of the outlet 34. There can be multiple nozzles for discharge of the heat exchange fluid, as a fire suppressing clean agent, into the discharge plenum 34. When the heat exchange fluid (clean agent) is discharged into the discharge plenum 34 it evaporates into a fire suppressing gas and it can be distributed into the conditioned space 22 by the action of the fan 16 of the fan coil unit 10. The network of piping 28 includes a pump 36 for sending fluid around a circuit from the chiller 30 to the coil(s) 14 of fan coil unit(s) 10 and the same pump 36 also acts as a pump in a fire suppression mode where it pumps the heat exchange fluid out of the fluid outlet(s) 32 of the fan coil unit(s) 10. In addition, an expansion tank 38 is provided in order to ensure an adequate supply of fluid for fire suppression use.

In this example the combined HVAC and fire suppression system also includes a water outlet 40, which can be coupled to a mains water supply such as the tap water supply. The water outlet 40 is used to allow for added fire suppression capabilities using water vapour.

There is also an evaporation system using a plate coupled to ultrasound transducers 42 for vibrating the plate and for promotion evaporation of fluid from the plate, e.g. to generate water vapour as water is provided from the water outlet 40, or to ensure that all of the clean agent is evaporator as the heat exchange fluid (clean agent) is discharged from the fluid outlet 32.

FIG. 2 is a schematic illustration of a structure 26 with multiple conditioned spaces 22, in this case two, and a corresponding fan coil unit 10 in each of the conditioned spaces 22. The fan coil units 10 can be as in FIG. 1. Each of the fan coil units 10 is connected to a network of piping 28 that includes a clean agent as the heat exchange fluid. This first network of piping 28 is a circuit with a pump 36 and expansion tank 38 as discussed above, as well as a chiller 30 for removing heat from the heat exchange fluid, which is a clean agent type fluid. Further, each of the fan coil units 10 is connected to a second network of piping 44 where a different heat exchange fluid, typically water, is circulated between a heat source 20 such as a boiler and the fan coil units 10. In this way the fan coil units 10 can provide either heating or cooling, as well as having a fire suppression function using release of the clean agent from the first network of piping 28.

What is claimed is:

1. A combined HVAC and fire suppression system, comprising:
- a HVAC apparatus including:
  - a network of piping holding a heat exchange fluid and arranged for chilling the heat exchange fluid via a chiller connected to the network of piping;
  - a fan coil unit connected to the network of piping, wherein the fan coil unit includes:

a cooling coil for passage of the heat exchange fluid chilled by the chiller;

a heating coil for heating of the air;

a fan for movement of air over the cooling coil in order to transfer heat from the air to the heat exchange fluid in the cooling coil; and a discharge plenum for passage of air into a conditioned space after it has moved over the cooling coil; and a fluid outlet for release of the heat exchange fluid into the discharge plenum;

wherein the heat exchange fluid in the network of piping is a clean agent, such that release of the heat exchange fluid into the discharge plenum provides a fire suppressant effect for the conditioned space, and wherein the discharge plenum is within a housing of the fan coil unit and wherein the discharge plenum is arranged between the fan and an outlet of the fan coil unit.

2. A combined HVAC and fire suppression system as claimed in claim 1, comprising a pump connected to the network of piping for pumping of the heat exchange fluid within the network of piping, wherein the pump is configured for use in a HVAC mode of operation or in a fire suppression mode of operation, wherein during the HVAC mode the pump acts to convey the heat exchange fluid between the chiller and the fan coil unit and wherein during the fire suppression mode the pump is configured for pumping the heat exchange fluid out of the fluid outlet to discharged it as a fire suppression agent.

3. A combined HVAC and fire suppression system as claimed in claim 1, wherein the network of piping is connected to an expansion tank in order to ensure adequate supply of heat exchange fluid for dispersal as a fire suppression agent.

4. A combined HVAC and fire suppression system as claimed in claim 1, comprising the chiller in heat exchange relationship with the heat exchange fluid, wherein the chiller comprises a refrigeration system having a refrigeration circuit configured to remove heat from the heat exchange fluid using a heat absorbing heat exchanger of the refrigeration circuit.

5. A combined HVAC and fire suppression system as claimed in claim 1, wherein the clean agent is a halocarbon fire suppression agent.

6. A combined HVAC and fire suppression system as claimed in claim 1, wherein the fluid outlet for release of the heat exchange fluid into the discharge plenum comprises one or more nozzles in or near to the discharge plenum and wherein the system comprises a valve for controlling the flow of fluid out of the fluid outlet.

7. A combined HVAC and fire suppression system as claimed in claim 1, comprising an ultrasonic evaporation device for promoting the evaporation of fluid, wherein the ultrasonic evaporation device comprises an ultrasonic transducer for vibrating an evaporation surface to promote evaporation of fluid on the evaporation surface.

8. A combined HVAC and fire suppression system as claimed in claim 7, comprising a water outlet for emitting water onto the evaporation surface.

9. A combined HVAC and fire suppression system as claimed in claim 1 wherein the fan-coil unit is arranged with the fan downstream of the cooling coil, and wherein the fluid outlet is arranged downstream of the fan.

10. A combined HVAC and fire suppression system as claimed in claim 1 wherein the heat exchange fluid flows through an aluminium heat absorbing heat exchanger of the chiller and/or an aluminium coil of the fan coil unit.

11. A combined HVAC and fire suppression system as claimed in claim 1, wherein the system comprises a heater for heating a second heat exchange fluid for the second heating coil, and a second heat exchange fluid is provided via a second network of piping.

12. A structure comprising a combined HVAC and fire suppression system as claimed in claim 1, wherein there are multiple fan coil units and wherein the network of piping extends between multiple conditioned spaces within the structure with the of fan coil units being installed within the multiple conditioned spaces.

13. A method of providing a structure with a combined HVAC and fire suppression system, the method comprising installing the combined HVAC system and fire suppression system within the structure, wherein the combined HVAC system and fire suppression system is as claimed in claim 1.

14. A method as claimed in claim 13, comprising modifying an existing HVAC system to provide added fire suppression capabilities by:

removing water used as a heat exchange fluid and replacing it with a clean agent, and adding a fluid outlet for release of the heat exchange fluid into the discharge plenum of the fan coil unit.

15. A method of using the combined HVAC and fire suppression system as claimed in claim 1, wherein the method includes:

operating the system in a HVAC mode or in a fire suppression mode;

wherein the HVAC mode includes circulation of the heat exchange fluid within the network of piping to convey heat from the cooling coil of the fan coil unit to the chiller; and/or wherein the fire suppression mode includes discharge of the heat exchange fluid via the fluid outlet in order to provide a fire suppression effect by distribution of evaporated heat exchange fluid into the conditioned space.

16. A combined HVAC and fire suppression system as claimed in claim 5, wherein the clean agent is a fluorinated ketone fire suppression agent.

17. A combined HVAC and fire suppression system as claimed in claim 1, wherein the heat exchange fluid evaporates into a fire suppressing gas and is distributed into the conditioned space by the action of the fan of the fan and coil unit.

18. A combined HVAC and fire suppression system as claimed in claim 1, comprising an ultrasonic evaporation device for promoting the evaporation of the clean agent, wherein the ultrasonic evaporation device comprises an ultrasonic transducer for vibrating an evaporation surface at a base of the discharge plenum to promote evaporation of the clean agent on the evaporation surface.

* * * * *